US009823920B2

United States Patent
Mahapatra et al.

(10) Patent No.: US 9,823,920 B2
(45) Date of Patent: Nov. 21, 2017

(54) METHOD FOR UPDATING FIRMWARE AND CONFIGURATION FILE AND A FIRMWARE-CONFIGURATION FILE MANAGEMENT SYSTEM THEREFOR

(71) Applicant: Wipro Limited, Bangalore (IN)

(72) Inventors: Niladri Das Mahapatra, Bangalore (IN); Rajesh Thiruvenkatam, Bangalore (IN); Nithin Khiledaar, Bangalore (IN)

(73) Assignee: CARRIER CORPORATION, Farmington, CT (US)

( * ) Notice: Subject to any disclaimer, the term of this patent is extended or adjusted under 35 U.S.C. 154(b) by 19 days.

(21) Appl. No.: 14/820,005

(22) Filed: Aug. 6, 2015

(65) Prior Publication Data

US 2016/0350097 A1  Dec. 1, 2016

(30) Foreign Application Priority Data

Jun. 1, 2015 (IN) .......................... 2762/CHE/2015

(51) Int. Cl.
*G06F 9/44* (2006.01)
*G06F 9/445* (2006.01)

(52) U.S. Cl.
CPC .......... *G06F 8/665* (2013.01); *G06F 9/44505* (2013.01)

(58) Field of Classification Search
CPC ...................................... G06F 8/65
USPC ................... 717/168–177; 709/203
See application file for complete search history.

(56) References Cited

U.S. PATENT DOCUMENTS

| | | | | |
|---|---|---|---|---|
| 6,345,360 | B1 * | 2/2002 | Kamada | G06F 21/64 713/193 |
| 6,678,741 | B1 * | 1/2004 | Northcutt | G06F 8/65 707/999.008 |
| 7,171,658 | B2 * | 1/2007 | Ha | G06F 8/65 711/102 |
| 7,305,668 | B2 * | 12/2007 | Kennedy | G06F 9/4406 711/103 |
| 7,401,332 | B2 * | 7/2008 | Foster | G06F 8/60 710/10 |

(Continued)

OTHER PUBLICATIONS

Jadhav et al, "RTOS Based MODBUS Protocol Implementation on ARM-7 Processor ", ACM, pp. 1254-1257, 2011.*

(Continued)

*Primary Examiner* — Anil Khatri
(74) *Attorney, Agent, or Firm* — Cantor Colburn LLP (57) ABSTRACT

The present disclosure relates to a method and a firmware and configuration file management system (FCMS) for automatically updating firmware and configuration file of a device manager. In one embodiment, the firmware management system receives one or more inputs associated with configuration data of one or more devices coupled with the device manager. Based on the inputs, a new firmware comprising a Modbus library and new configuration file is generated. The device manager periodically requests the FCMS for availability of update in the firmware and configuration file. If the availability of update is determined, the new firmware and new configuration file is downloaded into the device manager. Thus, the system periodically checks for update and download the updated firmware and configuration file automatically.

13 Claims, 3 Drawing Sheets

(56) References Cited

U.S. PATENT DOCUMENTS

| | | | | |
|---|---|---|---|---|
| 7,409,685 B2* | 8/2008 | Chen | G06F 8/65 | 713/1 |
| 7,509,636 B2* | 3/2009 | McGuire | G06F 8/68 | 709/217 |
| 7,558,867 B2* | 7/2009 | Le | G06F 8/65 | 709/203 |
| 7,814,079 B2* | 10/2010 | Han | G06F 17/30109 | 707/696 |
| 7,904,895 B1* | 3/2011 | Cassapakis | G06F 8/665 | 711/115 |
| 8,245,224 B2* | 8/2012 | Fontijn | G11B 20/00086 | 369/47.21 |
| 8,250,560 B2* | 8/2012 | Hirayama | G06F 8/65 | 717/168 |
| 8,402,109 B2* | 3/2013 | Marino | G06F 21/56 | 709/201 |
| 8,473,940 B2* | 6/2013 | Ikeda | G06F 8/65 | 717/168 |
| 8,572,100 B2* | 10/2013 | Hamilton | G06F 17/30864 | 707/750 |
| 8,601,170 B1* | 12/2013 | Marr | G06F 21/572 | 710/15 |
| 8,726,262 B2* | 5/2014 | Ohama | G06F 11/1433 | 717/168 |
| 8,776,254 B1* | 7/2014 | Mraz | H04L 63/123 | 713/150 |
| 8,831,823 B2* | 9/2014 | Moinzadeh | G06F 8/60 | 340/438 |
| 8,887,144 B1* | 11/2014 | Marr | G06F 8/65 | 713/2 |
| 8,893,115 B2* | 11/2014 | Nagamine | G06F 8/65 | 717/168 |

OTHER PUBLICATIONS

Guillen et al, "Practical Evaluation of Code Injection in Encrypted Firmware Updates", IEEE, pp. 325-330, 2016.*
Goran Jurković et al, "Remote Firmware Update for Constrained Embedded Systems", IEEE, pp. 1019-1023, 2014.*
Gu et al, "Improving Reliability of Dynamic Software Updating Using Runtime Recovery ", IEEE, pp. 257-264, 2016.*
Kim et al, "Remote Progressive Firmware Update for Flash-Based Networked Embedded Systems", ACM, pp. 407-412, 2009.*
Ahn et al, "Automated Firmware Testing using Firmware-Hardware Interaction Patterns", ACM, pp. 1-10, 2014.*
Berg et al, "Firmware quality assurance", ACM, pp. 3-10, 1982.*

* cited by examiner

METHOD FOR UPDATING FIRMWARE AND CONFIGURATION FILE AND A FIRMWARE-CONFIGURATION FILE MANAGEMENT SYSTEM THEREFOR

This application is an Indian Patent Application Serial No. 2762/CHE/2015, filed Jun. 1, 2015, which is herein incorporated by reference.

FIELD

The present subject matter is related, in general to management system, and more particularly, but not exclusively to method and a firmware and configuration file management system for automatically updating firmware and configuration file of a device.

BACKGROUND

Generally, firmware/configuration file updates are required to fix bugs in the firmware, addressing functionality issues, and/or improving the performance and reliability of a device after the device installation. Different devices have different configuration modes that require different firmware versions for polling data. Conventionally, the process of updating firmware/configuration file is a manual process and there are several issues involved in the manual updating process such as lack of skills required for updating the firmware/configuration file. Further, the updating process is time consuming and may also incur errors by updating incorrect version of firmware or inappropriate configuration files. Moreover, if the update fails due to failure in the communication medium while updating, there is no alternate communication medium for replacement. Furthermore, the acknowledgement of firmware and configuration file update is also not available once the updating process is complete. Still further, updating process must be secure and reliable.

Therefore, there is a need for method and system for automatically updating the firmware and overcoming the disadvantages and limitations of the existing systems.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of automatically updating firmware and configuration file of a device manager. The method comprising receiving one or more inputs associated with configuration data of one or more devices communicatively coupled with the device manager. Further, the method comprises a step of generating a new configuration file and a new firmware associated with the device manager, wherein the configuration file comprises a unique configuration file ID and the new firmware comprises at least one Modbus library and a unique firmware ID. Upon generating the new firmware and the new configuration file, one or more requests from the device manager to update existing firmware and configuration file of the device manager are received periodically. Based on the one or more requests thus received, the device manager is updated with the new firmware and new configuration file.

Further, the present disclosure relates to a firmware and configuration file management system (FCMS) for automatically updating firmware and configuration file of a device manager coupled with the FCMS. The system comprises a processor and a memory communicatively coupled to the processor, wherein the memory stores processor-executable instructions, which, on execution, cause the processor to receive one or more inputs associated with configuration data of one or more devices communicatively coupled with the device manager. The processor is furthermore configured to generate a new configuration file and a new firmware associated with the device manager, wherein the configuration file comprises a unique configuration file ID and the new firmware comprises at least one Modbus library and a unique firmware ID. Upon generating the new firmware and the new configuration file, the processor is also configured to receive periodically one or more requests from the device manager to update existing firmware and configuration file of the device manager. Based on the one or more requests thus received, the device manager is updated with the new firmware and new configuration file.

Furthermore, the present disclosure relates to a non-transitory computer readable medium including instructions stored thereon that when processed by at least one processor cause a system to perform the act of receiving one or more inputs associated with configuration data of one or more devices communicatively coupled with a device manager. Further, the instructions cause the processor to generate a new configuration file and a new firmware associated with the device manager, wherein the configuration file comprises a unique configuration file ID and the new firmware comprises at least one Modbus library and a unique firmware ID. The processor is also configured to receive periodically one or more requests from the device manager to update existing firmware and configuration file of the device manager. Based on the one or more requests thus received, the device manager is updated with the new firmware and new configuration file.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method and a firmware and configuration file management system (FCMS) for automatically updating firmware and configuration file of a device manager. In one embodiment, the firmware management system receives one or more inputs associated with configuration data of one or more devices coupled with the device manager. Based on the inputs, a new firmware comprising a Modbus library and new configuration file is generated. The device manager periodically requests the FCMS for availability of update in the firmware and configuration file. If the availability of update is determined, the new firmware and new configuration file is downloaded into the device manager. Thus, the system periodically checks for update and download the updated firmware and configuration file automatically.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
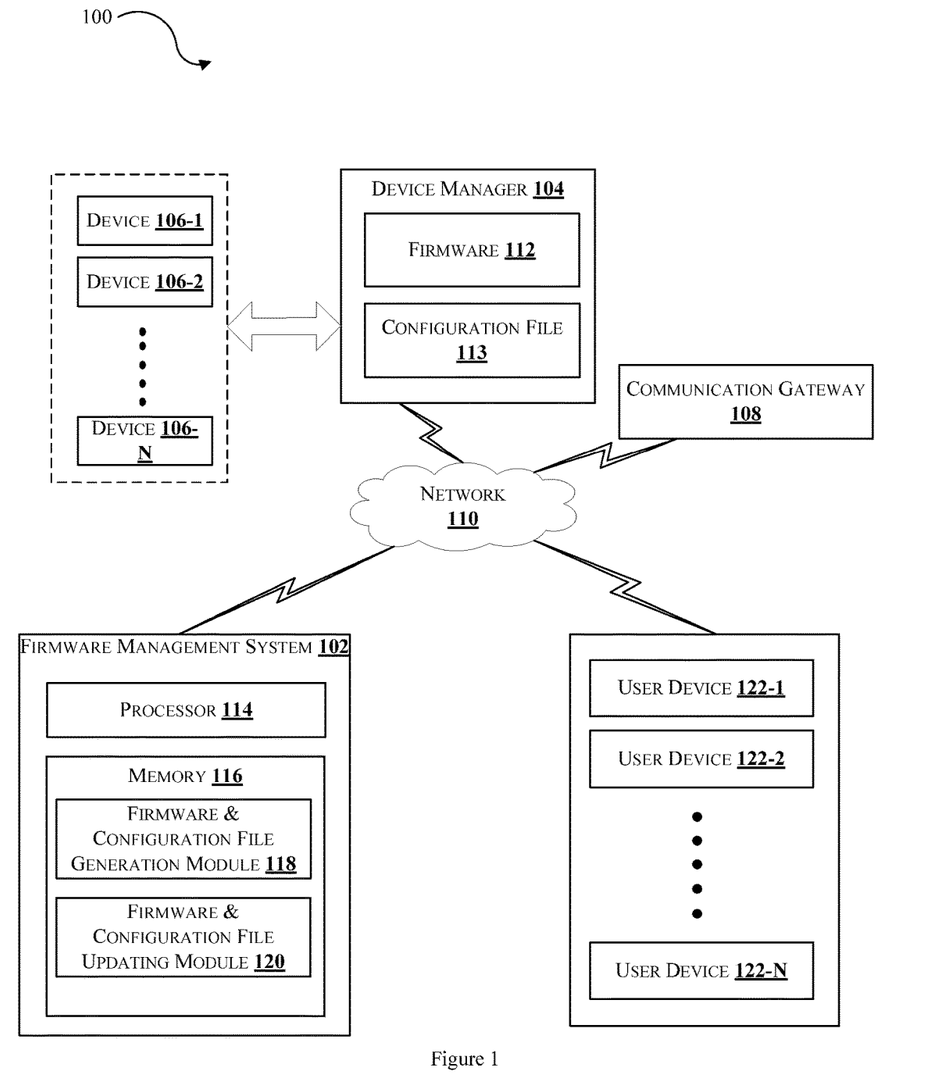
FIG. 1 illustrates an architecture diagram of an exemplary system for automatically updating firmware and configuration file in accordance with some embodiments of the present disclosure.

FIG. 1 illustrates an architecture diagram of an exemplary system for automatically updating firmware and configuration file in accordance with some embodiments of the present disclosure.

As shown in FIG. 1, the exemplary system 100 comprises one or more components configured for automatically updating firmware and configuration file of a device manager. In one embodiment, the exemplary system 100 comprises a firmware and configuration file management system 102 (hereinafter referred to as FCMS 102), a device manager 104, one or more devices 106-1, 106-2, . . . , 106-N (collectively referred to as devices 106) communicatively coupled with the device manager 104 and a communication gateway 108 connected via a communication network 110. The FCMS 102 may be a collection of one or more devices or servers like for example, SMS server to send and receive SMS messages, time server for time synchronization purpose, File Transfer Protocol (FTP) server for transferring files and data server for storage of data pertaining to the devices 106. The FCMS 102 enables automatic update of firmware 112 and configuration file 113 stored in the device manager 104 when a new firmware and configuration file is available. Using the firmware 112 and configuration file 113, the device manager 104 controls one or more functions of the devices 106. The devices 106 may be for example, energy meters of different types or makes, or temperature sensors connected to Field Input Output Analog device (FIOA), Field Input Output Device (FIOD) or fuel sensors and so on and may be located at different sites or locations for example, a restaurant or office.

The device manager 104 is configured to collect data from the devices 106 and transmit the collected data to the FCMS 102 for further processing. In an illustration of a restaurant, let us assume that the device manager 104 receives the input data from the devices 106 like temperature sensor about the room temperature at various sites like service area, kitchen, cold room, dry store, and reception area. In another example, the data may be associated with the devices including energy consumption data and other energy management related data. To collect the data, the device manager 104 communicates with the devices 106 via one or more communication protocols including for example, RS485 serial communication in Modbus protocol. The device manager 104 collects the data from the devices 106, generates a single data frame comprising the collected data and transmits the generated data frame to the FCMS 102 via the communication gateway 108. One example of communication gateway may be a Short Message Servicing (SMS) gateway that is capable of enabling communication between the device manager 104 and the FCMS 102 in the form of SMS messages during the transmission of data. The FCMS 102 receives and processes the received data, and determines statistical information required to control the operations of the devices 106.

In one embodiment, the FCMS 102 comprises a central processing unit ("CPU" or "processor") 114, a memory 116 coupled with the processor 114. The processor 112 receives the data from the device manager 104 and determines the statistical information based on the received data. The processor 112 also monitors the devices 106 in real time and controls the operations of the devices 106 based on the statistical information thus determined. For example, if the processor 112 determines that the temperature in service area is above a predetermined threshold temperature based on the temperature data received from the device manager 106, the processor 112 may notify the device manager 104 accordingly.

The FCMS 102 further comprises a firmware and configuration file generation module (FCGM) 118 and a firmware and configuration file updating module (FCUM) 120. The FCGM 118 generates a new firmware and configuration file based on one or more inputs provided by one or more users. Upon generating the new firmware and configuration file, the FCUM 120 updates the device manager 104 with the new firmware and configuration file on receiving the request for the same.

Figure 2:
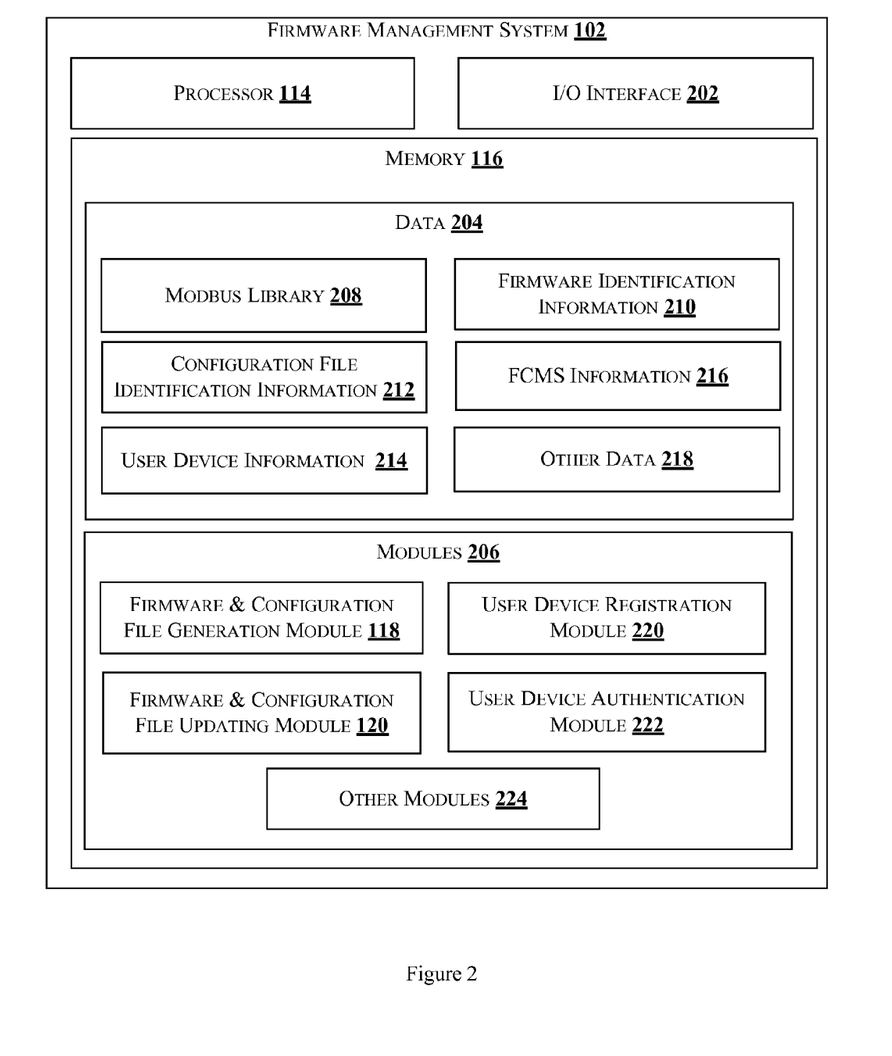
FIG. 2 illustrates an exemplary block diagram of a firmware management system of FIG. 1 in accordance with some embodiments of the present disclosure.

The FCMS 102 may be a typical FCMS as illustrated in FIG. 2. The FCMS 102 comprises the processor 114, the memory 116 and an I/O interface 202. The I/O interface 202 is coupled with the processor 114 and an I/O device. The I/O device is configured to receive inputs via the I/O interface 202 and transmit outputs for displaying in the I/O device via the I/O interface 202. The FCMS 102 further comprises data 204 and modules 206. In one implementation, the data 204 and the modules 206 may be stored within the memory 116. In one example, the data 204 may include Modbus library 208, firmware identification (ID) information 210, configuration file identification information 212, user device information 214, FCMS information 216 and other data 218. In one embodiment, the data 204 may be stored in the memory 116 in the form of various data structures. Additionally, the aforementioned data can be organized using data models, such as relational or hierarchical data models. The other data 218 may be also referred to as reference repository for storing recommended implementation approaches as reference data. The other data 218 may also store data, including temporary data and temporary files, generated by the modules 206 for performing the various functions of the FCMS 102.

The modules 206 may include, for example, the FCGM 118, the FCUM 120, a user device registration module (hereinafter referred to as registration module) 220 and a user device authentication module (hereinafter referred to as authentication module) 222. The modules 206 may also comprise other modules 224 to perform various miscellaneous functionalities of the FCMS 102. It will be appreciated that such aforementioned modules may be represented as a single module or a combination of different modules. The modules 206 may be implemented in the form of software, hardware and or firmware.

In operation, the FCMS 102 receives inputs form one or more users to customize the existing firmware and configuration file, and generates a new firmware and configuration file based on the received inputs. In one embodiment, the FCGM 118 is configured to generate a new firmware and configuration file based on the inputs received from the one or more users. The users may be for example, a system administrator or a system manager and inputs provided by the users may be related to configuration data of the devices 106. The FCGM 118 generates a new firmware comprising at least one Modbus library 208 and a unique firmware ID 210 or version associated with the new firmware. The Modbus library 208 comprises a plurality of customized applications configured to control and manage the operations of the devices 106. For example, the customized applications can be configured to control the devices 106 located in a particular site. The device manager 104 communicates via the Modbus communication protocol with the FIOD that in turn controls the devices 106 like heater, A/C, exhaust fan and so on.

The FCGM generates a new configuration file 113 comprising at least a unique configuration file ID 212, list of the devices 106 along with the corresponding device IDs, count of devices 106 coupled with the device manager 104, device manager ID, configuration data and timing schedule of each of the devices 106. For example, the timing schedule indicates the schedule of the devices 106 to change the state for example, ON, OFF or working conditions of the devices 106 at one or more sites. Based on the firmware 112 and configuration file 113, the device manager 104 controls the operation of the devices 106 in a manner configured in accordance with the customized applications and configuration data stored therein.

Further, the FCMS 102 receives one or more periodical requests from the device manager 104 to determine if there are any updates in the firmware 112 and configuration file 113. In one embodiment, the processor 114 determines the availability of new firmware and configuration file and updates the device manager 104 with new firmware and configuration file based on the determination. In one aspect, the processor 114 receives a firmware ID and a configuration file ID of the firmware and configuration file existing with the device manager 104 respectively. The processor 114 then compares the firmware ID of the new firmware 210 with the received firmware ID, and determines that the existing firmware is to be updated if the firmware ID 210 of the new firmware is greater than the received firmware ID. Further, the processor compares the configuration file ID 212 of the new configuration file with the received configuration file ID, and determines that the existing configuration file is to be updated if the configuration file ID 212 of the new configuration file is greater than the received configuration file ID.

In another embodiment, the device manager 104 determines the availability of new firmware and configuration file in the FCMS 102 and requests the FCMS 102 to update the device manager 104 with new firmware and configuration file based on the determination. In another aspect, the device manager 104 receives the firmware ID 210 and the configuration file ID 212 of the new firmware and new configuration file of the FCMS 102 and compare the firmware ID of the existing firmware with the received firmware ID 210. The device manager 104 then determines that the existing firmware is to be updated if the received firmware ID 210 is greater than the firmware ID of the existing firmware. Further, the device manager 104 compares the configuration file ID of the existing configuration file with the received configuration file ID 212, and determines that existing configuration file is to be updated if the received configuration file ID 212 is greater than the configuration file ID of the existing configuration file.

Upon determination of the availability of new firmware and new configuration file, one or more update requests will be made to the FCMS 102. In one embodiment, the device manager 104 sends the one or more update requests to the FCMS 102 to update the existing firmware 112 and existing configuration file 113.

In another embodiment, one or more user devices may send the one or more update requests for an update. In one implementation, the request for update is made by the one or more user devices 122-1, 122-2 . . . 122-N (collectively referred to as user devices 122) coupled with the device manager 104 via the network 110. The user devices 122 may be for example, a mobile device generally a portable computer or a computing device including the functionality for communicating over the network 110. For example, the mobile device can be a mobile phone, a tablet computer, a laptop computer, a handheld game console, or any other suitable portable devices. The user devices 122 may execute one or more applications such as web browser or special purpose applications to connect with the FCMS 102 and the device manager 104 during the update.

The user devices 122 may be registered with the FCMS 102 in order to interact with the FCMS 102 and the device manager 104. In one embodiment, the registration module 218 registers new user devices 122 by creating and storing an account or user device profile comprising user device information 214 in the memory 116. The user device information 214 may include information associated with each user device such as including, a unique user device identification number (ID), and a user device authentication key and so on. During the firmware update, the user devices 122 send the update request to the FCMS 102 via the device manager 104. The user devices 122 may transmit the update request via known communication means for example, SMS, email and so on. In one embodiment, the user devices 122 transmit the update request in the SMS format to the FCMS 102. The update request may be an authentication request and may comprise at least the user device ID, the user device authentication key and the FCMS identification information in a predefined format. The FCMS 102 receives the request and determines the validity of the user devices 122.

In one embodiment, the authentication module 220 of the FCMS 102 determines the authenticity of the user devices 122 by comparing the received user device information i.e., the user device ID and user device authentication key with the user device information 214 i.e., user device ID and user device authentication key respectively previously stored in the memory 116. If the comparison is successful, then the authentication module 220 sends an authentication signal to the user devices 122 in the form of for example, SMS text messages. Upon receiving the authentication signal, the user devices 122 may request the FCMS 102 to download the new configuration file.

The user devices 122 sends a configuration request for updating the existing configuration file of the device manager 104. In one example, the configuration request comprises the configuration file ID 212, at least unique identification information 216 of the FCMS 102 storing the new configuration file. In one implementation, the configuration request may be made via SMS text messages. Based on the configuration request thus received, the processor 114 updates the existing configuration file with the new configuration file by downloading the new configuration file from the FCMS 102 identified by the configuration file ID 212.

Further, the user devices 122 may transmit a download request to the FCMS 102 for downloading the new firmware and new configuration file from the FCMS 102. The download request may be for example, download over the air (DOTA) request and may include firmware ID 210 and location i.e. FTP path of the new firmware and new configuration file. In one example, the download request may be made via SMS text messages. The FCUM 120 receives the download request and downloads the new firmware upon receiving the request. On completion of successful download of both the new firmware and new configuration file, the FCUM 120 transmits an acknowledgement signal to the user devices 122 indicating the completion of update in the form of SMS text messages.

Thus, the system 100 periodically determines the presence of new firmware and new configuration file and updates the device manager 104 automatically whenever there is an update and without any human intervention. Further, the system 100 sends an acknowledgement signal to the device manager 104 upon completion of the update.

Figure 3:
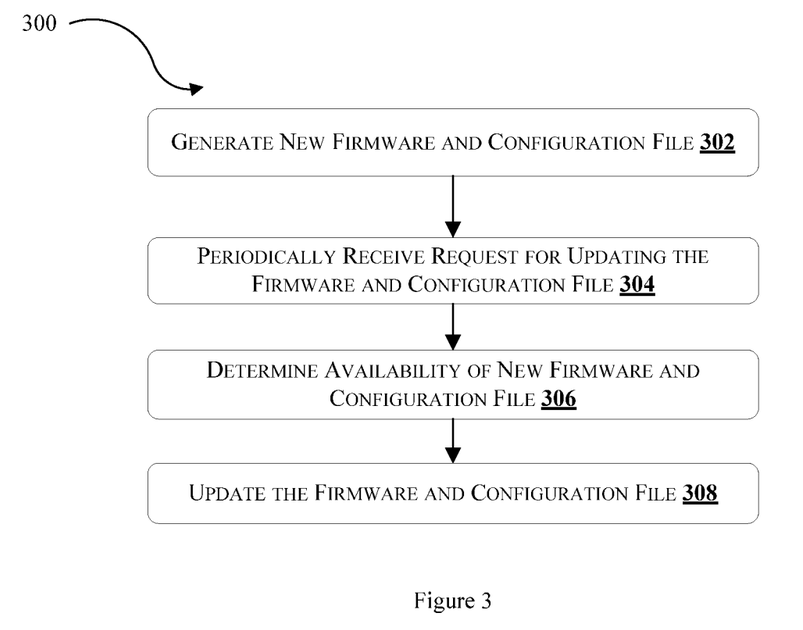
FIG. 3 illustrates a flowchart of an exemplary method of automatically updating firmware and configuration file in accordance with some embodiments of the present disclosure.

FIG. 3 illustrates a flowchart of a method of automatic assessment of a candidate in accordance with some embodiments of the present disclosure.

As illustrated in FIG. 3, the method 300 comprises one or more blocks implemented by the processor 114 of FCMS 102 for automatically updating firmware and configuration file of a device manager 104. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method 300. Additionally, individual blocks may be deleted from the method 300 without departing from the spirit and scope of the subject matter described herein. Furthermore, the method 300 can be implemented in any suitable hardware, software, firmware, or combination thereof.

At block 302, generate new firmware and configuration file. In one embodiment, the FCMS 102 receives inputs form one or more users to customize the existing firmware and configuration file, and generates a new firmware and configuration file based on the received inputs. In one embodiment, the FCGM 118 is configured to generate a new firmware and configuration file based on the inputs received from the one or more users. The users may be for example, a system administrator or a system manager and inputs provided by the users may be related to configuration data of the devices 106. The FCGM 118 generates a new firmware comprising at least one Modbus library 208 and a unique firmware ID 210 or version associated with the new firmware. The Modbus library 208 comprises a plurality of customized applications configured to control and manage the operations of the devices 106. The FCGM generates a new configuration file 113 comprising at least a unique configuration file ID 212, list of the devices 106 along with the corresponding device IDs, count of devices 106 coupled with the device manager 104, device manager ID, configuration data and timing schedule of each of the devices 106. By using the firmware 112 and configuration file 113, the device manager 104 controls the operation of the devices 106 in a manner configured in accordance with the customized applications and configuration data stored therein.

At block 304, periodically receive request for updating the firmware and configuration file. In one embodiment, the FCMS 102 receives one or more periodical requests from the device manager 104 to determine if there are any updates in the firmware 112 and configuration file 113. Upon receiving the periodical requests, the processor 114 determines the availability of new firmware and configuration file. In another embodiment, the device manager 104 determines the availability of new firmware and configuration file in the FCMS 102.

At block 306, determine availability of new firmware and configuration file. In one embodiment, the processor 114 determines the availability of new firmware and configuration file and updates the device manager 104 with new firmware and configuration file based on the determination. In one aspect, the processor 114 receives a firmware ID and a configuration file ID of the firmware and configuration file existing with the device manager 104 respectively. The processor 114 then compares the firmware ID of the new firmware 210 with the received firmware ID, and determines that the existing firmware is to be updated if the firmware ID 210 of the new firmware is greater than the received firmware ID. Further, the processor compares the configuration file ID 212 of the new configuration file with the received configuration file ID, and determines that the existing configuration file is to be updated if the configuration file ID 212 of the new configuration file is greater than the received configuration file ID.

In another embodiment, the device manager 104 determines the availability of new firmware and configuration file in the FCMS 102 and requests the FCMS 102 to update the device manager 104 with new firmware and configuration file based on the determination. In another aspect, the device manager 104 receives the firmware ID 210 and the configuration file ID 212 of the new firmware and new configuration file of the FCMS 102 and compare the firmware ID of the existing firmware with the received firmware ID 210. The device manager 104 then determines that the existing firmware is to be updated if the received firmware ID 210 is greater than the firmware ID of the existing firmware. Further, the device manager 104 compares the configuration file ID of the existing configuration file with the received configuration file ID 212, and determines that existing configuration file is to be updated if the received configuration file ID 212 is greater than the configuration file ID of the existing configuration file. Upon determination of the availability of new firmware and new configuration file, one or more update requests will be made to the FCMS 102.

At block 308, update the firmware and configuration file. In one embodiment, the device manager 104 sends the one or more update requests to the FCMS 102 to update the existing firmware 112 and existing configuration file 113. In another embodiment, one or more user devices 122 will send the one or more update requests for an update.

Figure 4:
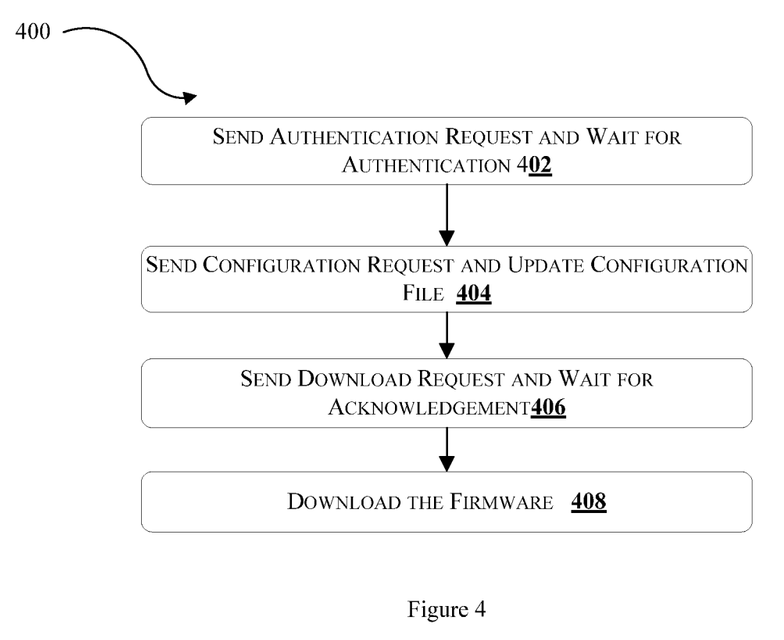
FIG. 4 illustrates a flowchart of an exemplary method of automatically updating firmware and configuration file by user devices in accordance with another embodiment of the present disclosure.

The user devices 122 may be registered with the FCMS 102 in order to interact with the FCMS 102 and the device manager 104. In one embodiment, the registration module 218 registers new user devices 122 by creating and storing an account or user device profile comprising user device information 214 in the memory 116. The user device information 214 may include information associated with each user device such as including, a unique user device identification number (ID), and a user device authentication key and so on. As illustrated in FIG. 4, the method 400 comprises one or more blocks implemented by the one or more user devices 122 of the system 100 for automatically updating firmware and configuration file of a device manager 104. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method 400. Additionally, individual blocks may be deleted from the method 400 without departing from the spirit and scope of the subject matter described herein. Furthermore, the method 400 can be implemented in any suitable hardware, software, firmware, or combination thereof.

At block 402, send authentication request and wait for authentication. In one embodiment, during the firmware update, the user devices 122 send the update request to the FCMS 102 via the device manager 104. The user devices 122 may transmit the update request via known communication means for example, SMS, email and so on. In one embodiment, the user devices 122 transmit the update request in the SMS format to the FCMS 102. The update request may be an authentication request and may comprise at least the user device ID, the user device authentication key and the FCMS identification information in a predefined format. The FCMS 102 receives the request and determines the validity of the user devices 122.

In one embodiment, the authentication module 220 of the FCMS 102 determines the authenticity of the user devices 122 by comparing the received user device information i.e., the user device ID and user device authentication key with the user device information 214 i.e., user device ID and user device authentication key respectively previously stored in the memory 116. If the comparison is successful, then the authentication module 220 sends an authentication signal to the user devices 122 in the form of for example, SMS text messages. Upon receiving the authentication signal, the user devices 122 may request the FCMS 102 to download the new configuration file.

At block 404, send configuration request and update configuration. In one embodiment, the user devices 122 sends a configuration request for updating the existing configuration file of the device manager 104. In one example, the configuration request comprises the configuration file ID 212, at least unique identification information 216 of the FCMS 102 storing the new configuration file. In one implementation, the configuration request may be made via SMS text messages. Based on the configuration request thus received, the processor 114 updates the existing configuration file with the new configuration file by downloading the new configuration file from the FCMS 102 identified by the configuration file ID 212.

At block 406, send download request and wait for acknowledgement. In one embodiment, the user devices 122 may transmit a download request to the FCMS 102 for downloading the new firmware and new configuration file from the FCMS 102. The download request may be for example, download over the air (DOTA) request and may include firmware ID 210 and location i.e. FTP path of the new firmware and new configuration file. In one example, the download request may be made via SMS text messages.

At block 408, download the firmware. In one embodiment, the FCUM 120 receives the download request and downloads the new firmware upon receiving the request. On completion of successful download of both the new firmware and new configuration file, the FCUM 120 transmits an acknowledgement signal to the user devices 122 indicating the completion of update in the form of SMS text messages.

Thus, the method 300 periodically determines the presence of new firmware and new configuration file and updates the device manager 104 automatically whenever there is an update and without any human intervention. Further, the system 100 sends an acknowledgement signal to the device manager 104 upon completion of the update.

As described above, the modules 206, amongst other things, include routines, programs, objects, components, and data structures, which perform particular tasks or implement particular abstract data types. The modules 206 may also be implemented as, signal processor(s), state machine(s), logic circuitries, and/or any other device or component that manipulate signals based on operational instructions. Further, the modules 206 can be implemented by one or more hardware components, by computer-readable instructions executed by a processing unit, or by a combination thereof.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for automatically updating a firmware and configuration files of a device manager, the method comprising:
    receiving, by a processor of a firmware and configuration file management system (FCMS), one or more inputs associated with configuration data of one or more devices communicatively coupled with the device manager;
    generating, by the processor, a new configuration file and a new firmware associated with the device manager based on the configuration data,
    wherein the configuration file comprises a unique configuration file ID and the new firmware comprises at least one Modbus library and a unique firmware ID, the Modbus library comprising a plurality of customized applications configured to control and manage operations of the one or more devices communicatively coupled with the device manager;
    receiving periodically, by the processor, one or more requests from the device manager to update existing firmware and configuration file of the device manager; and
    updating, by the processor, the device manager with the new firmware and new configuration file upon receiving the one or more requests;
    wherein the configuration file further comprises configuration data and timing schedule of the one or more devices and at least one Modbus library comprises a plurality of customized applications configured to control operations of the one or more devices.

2. The method as claimed in claim 1, wherein upon the receiving periodically the one or more requests from the device manager, the method further comprising:
    receiving, by the processor, a firmware ID and a configuration file ID of the existing firmware and configuration file of the device manager respectively;
    comparing, by the processor, the firmware ID of the new firmware with the received firmware ID, and determining that the existing firmware is to be updated if the firmware ID of the new firmware is greater than the received firmware ID; and
    comparing, by the processor, the configuration file ID of the new configuration file with the received configuration file ID, and determining that existing configuration file is to be updated if the configuration file ID of the new configuration file is greater than the received configuration file ID.

3. The method as claimed in claim 1, further comprising:
    receiving, by the processor, a request for registration of one or more user devices;
    creating, by the processor, one or more user device profiles corresponding to the one or more user devices, wherein the one or more user device profiles comprises at least a unique user device ID and a user device authentication key associated with the one or more user devices; and
    enabling, by the processor, the one or more user devices to update the device manager with the new firmware and new configuration file.

4. The method as claimed in claim 3, wherein the enabling the one or more devices to update the device manager further comprising:
    receiving, by the processor, an authentication request from the one or more user devices, wherein the authentication request comprises at least the unique user device ID and the user device authentication key associated with the one or more user devices;
    authenticating, by the processor, the one or more user devices based on the user device authentication key and the identification information thus received; and
    receiving, by the processor, at least one of a configuration request and a firmware download request for updating the existing configuration file and firmware respectively of the device manager, wherein the configuration request comprises at least a unique identification information of the FCMS, wherein the download request comprises at least location information of the new firmware and firmware ID of the new firmware.

5. The method of claim 4 wherein:
    receiving, by the processor, at least one of the configuration request and the firmware download request for updating the existing configuration file comprises receiving a download request from a user device via an SMS message; and
    upon completion of successful download of both new firmware and new configuration file to the device, transmitting an acknowledgement signal to the user device in the form of an SMS message.

6. A firmware and configuration file management system (FCMS) for automatic updating of a firmware and configuration file of a device manager coupled with the FCMS, the system comprising:
a processor; and
a memory coupled to the processor and storing processor-executable instructions comprising instructions to:
receive one or more inputs associated with configuration data of one or more devices communicatively coupled with the device manager;
generate a new configuration file and a new firmware associated with the device manager based on the configuration data,
wherein the configuration file comprises a unique configuration file ID and the new firmware comprises at least one Modbus library and a unique firmware ID, the Modbus library comprising a plurality of customized applications configured to control and manage operations of the one or more devices communicatively coupled with the device manager;
receive periodically one or more requests from the device manager to update existing firmware and configuration file of the device manager; and
update the device manager with the new firmware and new configuration file upon receiving the one or more requests;
wherein the configuration file further comprises configuration data and timing schedule of the one or more devices and at least one Modbus library comprises a plurality of customized applications configured to control operations of the one or more devices.

7. The system as claimed in claim 6, wherein upon the receiving periodically the one or more requests from the device manager, the processor-executable instructions stored in memory further comprise instructions to:
receive a firmware ID and a configuration file ID of the existing firmware and configuration file of the device manager respectively;
compare the firmware ID of the new firmware with the received firmware ID, and determining that the existing firmware is to be updated if the firmware ID of the new firmware is greater than the received firmware ID; and
comparing the configuration file ID of the new configuration file with the received configuration file ID, and determining that existing configuration file is to be updated if the configuration file ID of the new configuration file is greater than the received configuration file ID.

8. The system as claimed in claim 6, wherein the processor-executable instructions stored in memory further comprise instructions to:
receive a request for registration of one or more user devices;
create one or more user device profiles corresponding to the one or more user devices, wherein the one or more user device profiles comprises at least a unique user device ID and a user device authentication key associated with the one or more user devices; and
enable the one or more user devices to update the device manager with the new firmware and new configuration file.

9. The system as claimed in claim 8, wherein the processor-executable instructions stored in memory further comprise instructions to enable the one or more user devices to update the device manager by instructions to:
receive an authentication request from the one or more user devices, wherein the authentication request comprises at least the unique user device ID and the user device authentication key associated with the one or more user devices;
authenticate the one or more user devices based on the user device authentication key and the identification information thus received; and
receive at least one of a configuration request and a firmware download request for updating the existing configuration file and firmware respectively of the device manager, wherein the configuration request comprises at least a unique identification information of the FCMS, wherein the download request comprises at least location information of the new firmware and firmware ID of the new firmware.

10. A non-transitory computer readable medium including instructions stored thereon that when processed by at least one processor cause a system to:
receive one or more inputs associated with configuration data of one or more devices communicatively coupled with a device manager;
generate a new configuration file and a new firmware associated with the device manager based on the configuration data,
wherein the configuration file comprises a unique configuration file ID and the new firmware comprises at least one Modbus library and a unique firmware ID, the Modbus library comprising a plurality of customized applications configured to control and manage operations of the one or more devices communicatively coupled with the device manager;
receive periodically one or more requests from the device manager to update existing firmware and configuration file of the device manager; and
update the device manager with the new firmware and new configuration file upon receiving the one or more requests;
wherein the configuration file further comprises configuration data and timing schedule of the one or more devices and the at least one Modbus library comprises a plurality of customized applications configured to control operations of the one or more devices.

11. The medium as claimed in claim 10, wherein the instructions for the receiving periodically the one or more requests from the device manager, on execution further cause the at least one processor to:
receive a firmware ID and a configuration file ID of the existing firmware and configuration file of the device manager respectively;
compare the firmware ID of the new firmware with the received firmware ID, and determining that the existing firmware is to be updated if the firmware ID of the new firmware is greater than the received firmware ID; and
compare the configuration file ID of the new configuration file with the received configuration file ID, and determining that existing configuration file is to be updated if the configuration file ID of the new configuration file is greater than the received configuration file ID.

12. The medium as claimed in claim 10, wherein the instructions, on execution further cause the at least one processor to:
receive a request for registration of one or more user devices;
create one or more user device profiles corresponding to the one or more user devices, wherein the one or more user device profiles comprises at least a unique user device ID and a user device authentication key associated with the one or more user devices; and enable the one or more user devices to update the device manager with the new firmware and new configuration file.

13. The medium as claimed in claim 12, wherein the instructions, on execution further cause the at least one processor to enable the one or more user devices to update the device manager by instructions to:

receive an authentication request from the one or more user devices, wherein the authentication request comprises at least the unique user device ID and the user device authentication key associated with the one or more user devices;

authenticate the one or more user devices based on the user device authentication key and the identification information thus received; and receive at least one of a configuration request and a firmware download request for updating the existing configuration file and firmware respectively of the device manager, wherein the configuration request comprises at least a unique identification information of the FCMS, wherein the download request comprises at least location information of the new firmware and firmware ID of the new firmware.

* * * * *